United States Patent Office 3,337,602
Patented Aug. 22, 1967

3,337,602
HYDROCARBYL AND METHOXYHYDROCARBYL ESTERS OF DIPEROXY CARBONIC ACID
James E. Guillet and Edmund B. Towne, Kingsport, Tenn., assignors to Eastman Kodak Company, Rochester, N.Y., a corporation of New Jersey
No Drawing. Original application Dec. 14, 1962, Ser. No. 244,594, now Patent No. 3,287,337, dated Nov. 22, 1966. Divided and this application Oct. 6, 1965, Ser. No. 509,235
7 Claims. (Cl. 260—463)

This application is a division of our U.S. application, Ser. No. 244,594, filed Dec. 14, 1962, entitled, "Esters of Diperoxy Carbonic Acid and Polymerization Processes Employing the Same," and now U.S. Patent No. 3,287,337.

This invention relates to novel compositions of matter. More particularly, this invention relates to a novel class of organic peroxides which are esters of diperoxy carbonic acid. In a specific aspect, this invention relates to organic peroxides which are of special utility in the polymerization of ethylenically unsaturated polymerizable monomers such as ethylene, acrylates, vinyl esters and the like.

In many commercial polymerizations, such as the polymerization of ethylene or styrene, for example, free radical catalysts or promoters such as di-t-butyl peroxide, lauroyl peroxide and tertiary butyl peracetate are employed. It is general practice when such compounds are employed to use very small concentrations so that the catalyst or promoter residues left in the polymer do not have to be removed therefrom after polymerization is completed. However, certain of the residues of these free radical promoters contain functional groups, such as acid or ester carbonyl, which tend to adversely affect the electrical properties of the polymer product. For example, in producing polyethylene in this manner the presence of acid or ester carbonyl tends to increase the dielectric loss factor of the polymer and this seriously interferes with its use in electrical applications such as in telephone-wire insulation, high-frequency cables, television cables and the like. Consequently, it is highly desirable to provide a catalyst for the polymerization of ethylenically unsaturated monomers such as ethylene which gives a very high yield of polymer per gram of catalyst or promoter. This will, of course, reduce the total amount of any undesirable residues left in the polymer after polymerization is completed.

Accordingly, it is an object of this invention to provide a new and improved class of organic peroxides, particularly organic peroxides which function as catalysts with a high degree of efficiency in the polymerization of ethylenically unsaturated polymerizable compounds.

Another object of this invention is to provide organic peroxide promoters which are especially efficacious in the polymerization of ethylenically unsaturated polymerizable compounds such as ethylene, styrene, methyl methacrylate and other acrylates, vinyl acetate and other vinyl esters.

Another object of this invention is to provide a new class of organic peroxide promoters for the production of polymers from ethylene, styrene, acrylates and the like which will have substantially reduced contamination resulting from catalyst residues.

A further object is to provide a new class of organic peroxides having utility in promoting other free radical reactions such as chlorination, bromination, telomerization and the like.

Another object of this invention is to provide organic peroxides useful as catalysts which are not sensitive to shock and can be safely handled in commercial practice.

Still another object of this invention is to provide polymerization processes employing highly efficient organic peroxide catalysts.

Other objects will become apparent upon an examination and consideration of the specification and claims that follow.

The novel organic peroxides of the present invention are esters of diperoxy carbonic acid and have the following formula:

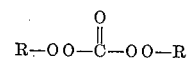

where R is the same or different aliphatic, cycloaliphatic or aromatic hydrocarbyl or substituted hydrocarbyl, desirably containing 5 to 20 carbon atoms. Such peroxides are not shock sensitive and exhibit an extremely high efficiency as catalysts in the polymerization of ethylenically unsaturated monomers, particularly those containing a

or more preferably a $CH_2=CH-$, group and 2–10 carbon atoms such as ethylene.

As already indicated, the R groups in the above formula usually contain 5–20 carbon atoms. However, R groups of 5–15 or even 5–10 carbon atoms will generally give good results, particularly where the peroxide is used as a catalyst to polymerize ethylene. The R groups which are most suitable are hydrocarbyl containing only carbon and hydrogen although substituents which can be present in the R groups include alkoxy such as methoxy, carbonyl, ester, carboxyl, nitro, amino, halogen and the like since substituents do not adversely affect the compositions. Suitable R groups include the alkyl, cycloalkyl, aryl, alkaryl radicals and are exemplified by pentyl, hexyl, decyl, dodecyl, tetradecyl, eicosyl, cyclohexyl, cycloheptyl, cyclohexenyl, cyclopentenyl, tolyl, methyl, propyl and dibutyl substituted phenyl, diphenyl, naphthyl and the like. Examples of the novel peroxides of this invention include bis(1-ethyl-1-methylheptyl) diperoxy carbonate, bis(2,2-dimethylhexyl) diperoxy carbonate, bis(1,1,3,3-tetramethylbutyl) diperoxy carbonate, dicyclohexyl diperoxy carbonate and bis(paramethoxy-α-methylbenzyl).

The novel peroxides of this invention can be prepared by a number of methods. Thus, they are conveniently prepared by reacting aliphatic, cycloaliphatic or aromatic hydroperoxides with phosgene in the presence of an acceptor for hydrogen chloride, such as pyridine. The resulting esters of diperoxy carbonic acid are soluble in organic solvents and can be removed from the reaction mixture in solution in a solvent such as hexane, heptane or benzene and purified by washing with dilute acid and water. These novel peroxides can also be made by reacting a hydroperoxide with phosgene in the presence of aqueous sodium hydroxide solution. In addition, they can be prepared by reacting a slurry of the sodium salt of a hydroperoxide in an inert organic medium such as benzene, toluene, hexane or heptane, with phosgene.

Solutions of the novel peroxides of this invention are usually stable at low temperatures and can be easily stored for long periods if reasonable precautions are taken to avoid over-heating or exposure to flame or ultraviolet light. These peroxides can be used in solution or in bulk polymerization at temperatures from about 0° C. to 250° C. or above, although temperatures of at least 30° C. are quite often used. In general, these peroxides give yields of from 2 to 5 times as much polymer per gram of catalyst as do peroxides commonly used as catalysts for the polymerization of vinyl monomers.

It will be understood, of course, that the novel peroxides disclosed herein can all be used as polymerization catalysts at temperatures in the range of 0 to 260° C. or above, but they will not all have the same activity at the same temperatures. For example, those containing substitutents alpha to the peroxy groups may decompose at different temperatures than those in which the alpha carbons contain only hydrogen. Furthermore, a significant feature of the peroxides of this invention is their insensitivity to shock. In contrast, compounds in which the R groups in the above structural formula contain 1–4 carbon atoms are quite sensitive to mechanical shock and, therefore, must be handled with extreme care if they are used as polymerization catalysts. In fact, some of these peroxides, even if handled with great care, tend to polymerize to form explosive compounds and, therefore, are not suitable for use as catalysts. In order to determine sensitivity to shock on a laboratory scale, small samples are subjected to a dropping weight test. The test and apparatus employed for carrying it out is described below.

Drop-weight test

The apparatus generally used for testing the impact sensitivity of small samples of materials involves the use of a dropping weight which falls on a piston resting on a hardened anvil. The sample is placed between the piston and the anvil and is thus exposed to the entire impact of the dropping weight. The most common form of this apparatus is designed primarily for use with solid explosives. The explosive is confined in a soft brass cap, and evidence of explosion is the sound of the report or the damage done to the cap.

In order to test liquid solutions, it is necessary to modify the aforementioned apparatus. Thus, the sample is contained in a small brass cap which makes a press-fit on the end of a piston. The piston rests on a hardened steel anvil and is surrounded by a steel ring which encloses the apparatus in a nearly gas-tight fit. The ring has a tube fitting connected to the gas buret by tubing. The whole assembly is surrounded by a metal shield during testing. This shield acts as a safety support for the weight when the apparatus is being assembled for testing. The weight can be dropped from any height up to 30 inches. When it hits the piston, a catch is released which stops the weight at the height of its rebound, thus preventing multiple impact. The entire apparatus is mounted on a heavy steel column, which is bolted to a concrete slab.

For a test, 20–40 mg. of sample is placed in a brass cap. The piston is then forced into the mouth of the cap and the whole assembly placed on the anvil through the guide and gas-retaining ring. During this operation the guard is up and the weight (15 lb.) is resting on the guard. The weight is then raised to the desired height and the guard dropped in place. The rider in the gas buret is placed at zero, and the weight is dropped. If no explosion has occurred, the position of the rider in the gas buret will have changed by less than 0.4 cc. A larger change than this is an indication of the evolution of gas during decomposition by a detonation or deflagration. The amount of gas given off by the sample so treated is measured and used to determine the amount of decomposition. The sensitivity of the compound can be estimated either by the height required to cause the compound to decompose or by the dilution required to make it insensitive to the impact of a weight dropped from the maximum height available with the test instrument.

Although the new compounds of the invention are of particular interest as catalysts for the polymerization of ethylenically unsaturated monomers, they can also be used in any processes requiring peroxide or free-radical generators, such as, for example, in catalyzing the chlorination of hydrocarbons, in bleaching various materials, in cross-linking various polymer resins and the like.

The following procedures are typical of those which can be employed in accordance with the invention in the polymerization of various ethylenically unsaturated polymerizable compounds.

(A) The polymerization of ethylene is accomplished as follows: a 100 cc. stainless steel autoclave equipped with a magnetic agitator is charged with the catalyst in toluene solution. The autoclave is flushed with ethylene, then pressured to the desired level and the temperature raised to reaction temperature. The reaction pressure is maintained by addition of compressed gas for a period of two hours after which time the reactor is cooled down and the unreacted ethylene vented. The polymer is recovered from the autoclave in the form of a dry, spongy mass.

(B) The polymerization of ethylenically unsaturated monomers other than ethylene can be accomplished as follows: One-tenth gram of the peroxide in toluene solution is placed in a vial and the toluene removed by pumping under vacuum. Twenty grams of purified monomer is charged and the vial sealed after flushing with nitrogen. The vials are heated for four hours at the desired reaction temperature, cooled to room temperature and opened. The polymer is dissolved in a suitable solvent such as acetone, toluene or benzene, precipitated with methanol, filtered, dried and weighed.

This invetnion can be further illustrated by the following examples of preferred embodiments thereof although it will be understood that these examples are included merely for purposes of illustration and are not intended to limit the scope of the invention unless otherwise specifically indicated.

Example 1

Bis(1-ethyl-1-methylheptyl)diperoxy carbonate is synthesized from the corresponding hydroperoxide which is reacted with phosgene and pyridine with the addition of a small volume of heptane at 0° C. The yield is 64.2 percent of theory. 1 mg. of this peroxide is used to catalyze the polymerization of ethylene using Procedure A at 20,000 p.s.i. Efficiency determinations are made at 140°, 160° and 180° C. The catalyst efficiencies are 4,200, 6,750 and 5,700 g./g. of catalyst under these conditions. The solvent is removed from the catalyst solution by vacuum stripping and the residual peroxide tested for shock sensitivity according to the previously described procedure. The concentration of the peroxide is 87 percent and it is insensitive to impact at the maximum height of the drop weight tester.

Example 2

Bis(2,2-dimethylhexyl)diperoxy carbonate is synthesized by the following sequence of reactions: 2,2-dimethylhexyl chloride is converted to the corresponding hydroperoxide by reaction of the chloride with hydrogen peroxide. Bis(2,2-dimethylhexyl)diperoxy carbonate is synthesized by reacting the hydroperoxide with phosgene. Batch scale polymerization tests are run with this peroxide as described in Example 1. At pressures of 20,000 lb./sq. in., using 1 mg. of catalyst, the following yields are obtained: At 140° C. 7.5 g., 160° C. 10.95 g., 180° C. 11.2 g., 200° C. 9.3 g. The catalyst is insensitive to shock at the maximum height of the drop weight tester after removal of all of the solvent.

Example 3

Bis(1,1,3,3-tetramethylbutyl)diperoxy carbonate is synthesized by reacting 1,1,3,3-tetramethylbutyl hydroperoxide with phosgene and pyridine in toluene solution at 0° C. The yield is 75.4 percent of theory. This catalyst, after removal of excess solvent, is found to be insensitive to shock at the maximum height of the drop weight tester. The infra-red spectrum of this compound shows a carbonyl doublet at 5.5–5.6 microns. One milligram of the catalyst is used for the polymerization of ethylene as described in Example 1. The yields and catalyst efficiencies at various temperatures are as follows:

| Temperature | Yield, g. | Catalyst Efficiency, g./g. |
|---|---|---|
| 120 | 0.5 | 500 |
| 140 | 7.50 | 7,500 |
| 160 | 10.95 | 10,950 |
| 180 | 11.20 | 11,200 |
| 200 | 9.30 | 9,300 |

*Example 4*

Bis($\alpha,\alpha'$-dimethylbenzyl)diperoxy carbonate is synthesized by reaction of cumene hydroperoxide with a toluene solution of phosgene in the presence of pyridine. After a reaction time of 4 hr. at 10° C. the toluene solution is washed with water and dried over sodium sulfate. The yield of peroxide is 46 percent based on titration with potassium iodide. After removal of the excess solvent, the peroxide is insensitive to shock at the maximum height of the drop weight tester.

Bis($\alpha,\alpha'$-dimethylbenzyl)diperoxy carbonate is used to catalyze the polymerization of styrene, methyl methacrylate, and vinyl acetate by the following procedure: 0.10 gram of the peroxide is placed in a vial with 20.0 grams of purified monomer. The vial is flushed with nitrogen and sealed. The vials are heated at 100° C. for 6 hr. in an air oven, after which they are cooled to room temperature, opened, and the polymer isolated by dissolving in acetone or benzene and precipitating with methanol. After drying in a circulating air oven, the yields and viscosities are determined and are tabulated below.

| Monomer | Yield, g. | Inherent Viscosity |
|---|---|---|
| Styrene | 19.2 | 0.62 |
| Methyl methacrylate | 17.6 | 1.54 |
| Vinyl acetate | 18.4 | 0.72 |

*Example 5*

Dicyclohexyl diperoxy carbonate is made by the following procedure:

2.0 grams of cyclohexyl hydroperoxide is dissolved in 10 ml. toluene and cooled to 0° C. 35 ml. of cold 5 percent NaOH solution is added, and 10 ml. of 20 percent solution of phosgene in toluene is added dropwise over a period of 30 minutes. The reaction mixture is stirred at 0–5° C. for 4 hours, the water layer removed and the organic layer washed twice with ice water. The yield is 45 percent based on titration with potassium iodide. The infra-red spectrum of the sample shows a strong carbonyl doublet in the range from 5.4–5.6 microns.

*Example 6*

Bis(paramethoxy-$\alpha$-methylbenzyl)diperoxy carbonate is prepared by reacting 1.5 grams of the sodium salt of paramethoxy-$\alpha$-methylbenzyl hydroperoxide with 7.0 ml. of 20 percent phosgene solution in a toluene dispersion cooled to $-10°$ C. After 6 hours reaction time the toluene is washed with water until neutral and dried over anhydrous magnesium sulfate. The yield of peroxide is 27 percent based on titration with potassium iodide.

From the above examples it can be seen that the novel peroxides of this invention are readily identifiable by their ability to quantitatively liberate iodine from potassium iodide, which can be used to determine the yield of peroxide, and by their characteristic infra-red spectrum which shows a carbonyl doublet generally in the range of 5.4 to 5.8$\mu$ which doublet is, of course, not shown by the hydroperoxide starting material.

As indicated by the foregoing description, the new organic peroxides of our invention can be employed as catalysts in the polymerization of a wide variety of ethylenically unsaturated compounds under varying conditions of temperature and pressure. The specific conditions will be selected by reference to the particular organic peroxide employed in a given polymerization, although temperatures in the range of about 0° to about 250° C. or above, can generally be employed. In addition, satisfactory results are often obtained at temperatures in the range of about 20° to about 30° C. The pressures generally range from about atmospheric pressures to about 3,000 atmospheres with pressures of at least 1500 atmospheres generally being used with ethylene. The polymerization reaction can be carried out in the presence of about 5 p.p.m. to about 5%, by weight, of catalyst, based on monomer feed.

Thus, this invention provides an unusually valuable class of organic peroxides which can be employed as catalysts for free radical reactions. These new peroxides are characterized by unusually high efficiencies and are not sensitive to shock. Since it is well known that free radical reactions suffer from relatively low efficiencies in many cases, the provision of promoters having the unusually high efficiency of the promoters of this invention will make economic many processes now considered to be too expensive for commercial utility. In the case of polyethylene and polystyrene and other vinyl polymers, it will be obvious that a substantial improvement in polymer properties will be made possible as a result of the lower amount of catalyst residues which are a result of the high efficiencies of the peroxides of this invention when used as polymerization promoters.

Although the invention has been described in considerable detail with particular reference to certain preferred embodiments thereof, variations and modifications can be effected within the spirit and scope of the invention as described hereinabove, and as defined in the appended claims.

We claim:

1. Organic peroxides having the formula:

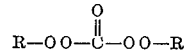

where each R is a member selected from the group consisting of hydrocarbyl and methoxyhydrocarbyl radicals of 5 to 20 carbon atoms.

2. Bis(1-ethyl-1-methylheptyl)diperoxy carbonate.
3. Bis(1,1,3,3-tetramethylbutyl)diperoxy carbonate.
4. Bis($\alpha,\alpha'$-dimethylbenzyl)diperoxy carbonate.
5. Dicyclohexyl diperoxy carbonate.
6. Bis(paramethoxy-$\alpha$-methyl benzyl)diperoxy carbonate.
7. Bis(2,2-dimethylhexyl) diperoxy carbonate.

References Cited

Martin: J. Am. Chem. Soc., vol. 83, pp. 2869 to 2873 (1961).

Strain et al.: J. Am. Chem. Soc., vol. 72, pp. 1254–1263 (1950).

CHARLES B. PARKER, *Primary Examiner.*

FLOYD D. HIGEL, *Examiner.*